3,392,096
SOLUBLE SULFONATED VINYL ARYL POLYMERS CROSSLINKED WITH AN ALLYL AMINE
Elliott J. Lawton and John S. Balwit, Schenectady, N.Y., assignors to General Electric Company, a corporation of New York
No Drawing. Filed Mar. 2, 1964, Ser. No. 348,835
19 Claims. (Cl. 204—159.15)

This invention relates to the irradiation of resins and more particularly relates to irradiation of sulfonated polymers of vinylaryl compounds having ion exchange properties. Still more particularly, the present invention relates to a method for preparing improved sulfonated vinylbenzene and sulfonated vinyltoluene ion exchange resins by irradiation with ionizing radiation and to the improved resins so produced.

Ion exchange resins are well known in the art. A particularly useful and widely used type of ion exchange resin is the sulfonated polystyrene resin which has been cross-linked by incorporation of a difunctional monomer, such as divinylbenzene. The cross-linking of the polystyrene is necessary because on sulfonation of polystyrene itself the polymer becomes water-soluble when about one-third of the benzene nuclei have been sulfonated, i.e., one sulfonic acid group is present for each three benzene nuclei in the polymer. Since the ion exchange properties of these resins are dependent on the sulfonic acid group, it is highly desirable to increase the ion exchange capacity of these resins by increasing the number of sulfonic acid groups on the polymer chain, with the desirable ratio being at least one sulfonic acid group on each aryl nucleus of the polystyrene resin. Since the polymers having one sulfonic acid group for each benzene nucleus would be very water-soluble, they cannot be used in contact with aqueous solutions, unless they have been cross-linked with a difunctional monomer such as divinylbenzene, to render them insoluble.

Because monomeric vinylbenzene sulfonic acid is difficult to prepare and also difficult to polymerize, the usual way for preparing the sulfonated cross-linked polystyrene resins has been to prepare the copolymer of styrene and a cross-linking monomer, e.g., divinylbenzene, to produce the insoluble copolymer which is then sulfonated. Unfortunately, because of the insolubility of the copolymer, the sulfonation of these polymers to obtain a high degree of sulfonation throughout the entire structure has required considerable time and, because of the dehydrating action of the sulfonating agent, has resulted in some decomposition of the polymer. It would be highly desirable if it were possible to sulfonate the resin while it is in the soluble state so that the sulfonation could proceed readily and under less drastic conditions to avoid decomposition of the polymer by the sulfonating agent. As mentioned previously, these resins are known but are water-soluble when sulfonated to the desired degree, but unfortunately, no known process is available to readily cross-link such polymers to render them water-insoluble. Attempts to cross-link such polymers by ionizing radiation requires radiation doses in excess of $500 \times 10^6$ rep to produce polymers which are not soluble in water and do not have excessive swelling when in contact with water or aqueous solutions.

We have now discovered that the sulfonated polymers of vinylbenzene and vinyltoluene may be readily cross-linked with ionizing radiation at much lower doses than usually required providing the polymer is first mixed with from 10 to 100 mole percent, based on the sulfonated polymer of the vinylaryl compound, of a monomer selected from the group consisting of allylamine, diallylamine, triallylamine, and salts of these three amines with acids, especially the sulfuric acid salt.

The water-soluble, sulfonated polymers of aryl compounds which we may use are the water-soluble, sulfonated polymers of vinylbenzene, also known as sulfonated polymers of styrene, the water-soluble, sulfonated polymers of vinyltoluene, mixtures of said polymers, as well as sulfonated copolymers of vinylbenzene and vinyltoluene. The terminology "a water-soluble sulfonated polymer of a vinylaryl compound selected from the group consisting of vinylbenzene and vinyltoluene" includes all of the aforementioned polymers, copolymers and mixed polymers. They may readily be prepared by sulfonation of the desired polymer using any of the known sulfonation techniques, e.g., as described in U.S. Patents 2,533,-210 and 2,533,211.

The amines which we may use are allylamine, diallylamine, triallylamine, and salts of these amines formed by reacting the amine with an acid. Since the acid used in forming these salts must be resistant to radiation and as explained later, must be a stronger acid than the sulfonic acid groups on the vinylaryl polymer, and furthermore, since it is washed out of the polymer after irradiation, the cheapest and most convenient acid to use is sulfuric acid. The amount of acid used in forming the salt can be any amount up to the equivalent amount required to completely react with and neutralize the basicity of the amine. The purpose of using the salt of the amine is two-fold.

In the first place, the sulfonated polymers of the vinylaryl compound are quite temperature-sensitive and therefore in forming the mixture with the amine, the most convenient way of forming the mixture is to dissolve the polymer and amine in water either together or in separate solutions and thereafter mixing the two solutions. If the non-neutralized or free amine is used or the amine is only partially in the form of a salt, then the free amine reacts with the sulfonic acid groups of the sulfonated polymer forming salts with the polymer. On the other hand, if the amine is used in the form of its completely neutralized salt and the acid is at least as strong an acid as the sulfonic acid groups of the sulfonated polymer, then the amine salt does not react with the sulfonic acid groups of the polymer.

Surprisingly enough, even though enough amine is used in the form of the free amine to react with all of the sulfonic acid groups at this stage, after irradiation and cross-linking of the polymer the sulfonic acid groups apparently become dissociated from the amine group during the cross-linking reaction or on contact with water and therefore the sulfonic acid groups are available as ion exchange groups capable of absorbing cations from aqueous solutions in the same way as when the amine is used in the form of its salt or no amine was used at all. The second benefit obtained by use of the amine in the form of its completely neutralized salt is that the salts of the amines improve the cross-linking efficiency of the ionizing radiation to a much greater extent than the corresponding free amine.

Any convenient means may be used for mixing the allylamines or their salts with the sulfonated polymer of the vinylaryl compound. For example, they may be mixed in a convenient mutual organic solvent, the amine may be dissolved in a solvent and diffused into the polymer, or they may be blended by careful application of heat. However, the most convenient solvent to use and the most convenient means is to use water as the solvent, since it is the cheapest and most convenient solvent for dissolving both the polymer and the amine or the amine salt. By this means, a very homogeneous mixture is obtained. Once obtained, this solution may be evaporated or diluted to give solutions of various viscosities and concentrations. The solutions of the mixture can be used to make films of the polymer by evaporation of the solvent after casting the solution by well known techniques onto a casting surface, e.g., a polymer, glass, highly polished metal plate, endless belt, etc., to which the film does not adhere tightly and from which the film is easily stripped after evaporation of the solvent. If granules are desired, the solution may be spray-dried or the solution cast into a massive form which is ground to give irregularly shaped granules.

After the mixture of the amine or amine salt and the sulfonated polymer of the vinylaryl compound is obtained in the desired solid shape, the solid material is subjected to ionizing radiation. This may be done by placing the material in the path of any source of ionizing radiation. The ionizing radiation penetrates the material to a depth dependent upon the energy of the ionizing radiation. In those cases where the ionizing radiation is completely absorbed in the thickness of the material being irradiated or the material is of appreciable thickness, uniform treatment with ionizing radiation may be obtained by first irradiating the material from one side and then the other, or from both sides simultaneously. In certain instances, it may be desirable to irradiate the material in an inert atmosphere, for example in an atmosphere of nitrogen, argon, helium, krypton, enon, etc., to prevent the effect of any corona present or deleterious effect due to oxygen of the air. The irradiation can be carried out at any desirable temperature, for example, below room temperature, at room temperature, or at elevated temperature. However, a temperature high enough to cause decomposition of the polymer would, of course, not be used. Generally, for ease of processing and equipment required, we prefer to perform the irradiation at essentially the ambient temperature.

The most commonly employed units for measuring high energy radiation are (1) roentgen units and (2) roentgen equivalent physical units. Roentgen units are more commonly used to measure gamma and X-rays and are usually defined as the amount of radiation that produces one electrostatic unit of charge per milliliter of dry air under standard conditions. The roentgen equivalent physical unit (the "rep") is a convenient unit which usually describes the radiation dose from other than gamma or X-rays, and is the measure of the ionization in the absorber of tissue. The ionization produced by primary radiation is expressed as one rep when the energy lost in tissue is equivalent to the energy lost by the absorption of one roentgen of gamma or X-rays in air. Further definitions of "roentgen" and "rep" can be found on p. 256 of "The Science and Engineering of Nuclear Power," edited by Clark Goodman (1947) and on p. 436 of "Nuclear Radiation Physics," by Lapp and Andrews (1948). For convenience, the term "roentgen equivalent physical" or "rep" or "megarep" ($10^6$ rep) will be used in this application.

In general, the energy of the irradiation advantageously employed in the practice of our invention may range from about 50,000 to 20 million electron volts or higher depending upon materials. Although high energy electron irradiation is preferred since it produces a large amount of easily controllable, less costly, high energy ionizing radiation within a short period of time without rendering the product radioactive, many other sources of high energy ionizing radiation can also be used in our invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; fast or slow neutrons or the mixed neutron and gamma radiation, such as is present in certain atomic reactors; X-rays; and other miscellaneous sources, such as protons, deuterons, α-particles, fission fragments, such as are available from cyclotrons, etc. High energy electron sources can be any convenient source such as the high energy electron source disclosed in U.S. Patent 2,992,927, the betatron, other miscellaneous sources such as a Van de Graaff generator etc.

The radiation dose employed in carrying out this invention will be dependent upon the application in which the cross-linked polymer is to be used and the properties desired in the final polymer. Preferably, the dose should be as low as possible consistent with obtaining the properties desired. Thus, doses of about $1 \times 10^6$ rep to $1 \times 10^8$ rep are generally satisfactory. The radiation dose used to obtain a given degree of cross-linking or percent swelling in aqueous solutions is dependent upon the amine used, whether the amine is used as a free amine or as a salt of the amine and the concentration of the amine in the composition. Triallylamine is more effective than diallylamine and diallylamine is more effective than allylamine, and the salts of these amines are more effective than the corresponding free amine in causing cross-linking at lower irradiation doses. Because of this, triallylamine and its sulfuric acid salt are the preferred compounds to be used. Likewise, as the concentration of any of these materials increases in the sulfonated polymer, the more effective it is in causing cross-linking at lower radiation doses. A convenient way of demonstrating the effectiveness of these materials to increase the cross-linking efficiency is to compare the amount the polymer swells in water at a given radiation dose or conversely, the radiation dose necessary to cause the polymer to be cross-linked enough to give a certain percent swelling in water. In order to obtain such data, it is convenient to irradiate each polymer mixture to a given radiation dose, determine the percent of swelling of the polymer in water, and thereafter make a graph of the results to show the relationship of the percent swelling as a function of the radiation dose.

From our results, wherein we also have measured the conductivity of the polymers at various degrees of swelling, we have determined that the maximum conductivity per unit volume which is also indicative of the maximum ion exchange capacity occurs in the range of from 25 to 65 percent swelling. This is illustrated in the examples given below.

In preparing the solutions of the water-soluble sulfonated polymers and the amines or amine salts, other water-soluble or aqueous emulsions of polymers may be incorporated into the composition to modify the properties of the products obtained. For example, we have found that we may incorporate into the structures polyvinylpyrolidone, polyvinyl alcohols, hydrolyzed vinyl methyl ether-maleic anhydride copolymers, etc., aqueous emulsions, such as aqueous synthetic rubber latices, for example, aqueous emulsion of polybutadiene-styrene copolymers, butadiene-acrylonitrile copolymers, etc. Generally, the proportions of these added materials should be no greater than 25 percent by weight of the sulfonated polymer.

In order that those skilled in the art may better understand how the present invention may be practiced, the following examples are given by way of illustration and not by way of limitation.

GENERAL PROCEDURE

The general procedure for making the products in the examples is as follows. The sulfonated polymer is dissolved in at least the minimum amount of water. The amine or amine salt is also dissolved in at least the minimum amount of water and the two solutions mixed to give a uniform distribution of the amine or amine salt in the polymer solution. If another water-soluble polymer is also to be incorporated, it likewise is dissolved in at least the minimum amount of water and mixed with the other solution or the aqueous emulsion is added and thoroughly blended in the solution of the sulfonated polymer. These solutions were then cast onto a polytetrafluoroethylene film from which the films could be readily stripped after evaporation of the water at room temperature. In this way, films approximately 0.075 cm. thick were prepared. These films were cut into strips which were irradiated with high energy electrons to various radiation doses. After irradiation, the strips were immersed in water. The percent swelling was obtained by dividing the increase in length after swelling in water by the length of the strip prior to immersion in water multiplied by 100. Resistivity measurements were made on the swollen polymer. In the tables, AA is monoallylamine, DAA is diallylamine, and TAA is triallylamine. Concentration is given in mole of amine per mole of the sulfonated polymer. Radiation dose is given in megarep.

Example 1

Using the above general procedure, a polymer of vinyltoluene sulfonic acid having a molecular weight of approximately 40,000 was mixed with various concentrations of monoallylamine and diallylamine and irradiated to various doses. The percent swelling was determined with the results shown in Table I.

TABLE I.—PERCENT SWELLING AT VARIOUS RADIATION DOSES AS A FUNCTION OF AMINE AND ITS MOLAR CONCENTRATION

| | Percent Swelling | | | | | | |
|---|---|---|---|---|---|---|---|
| Amine | None | DAA | AA | DAA | AA | DAA | DAA |
| Concentration | None | $\frac{1}{8}$ | $\frac{1}{2}$ | $\frac{1}{4}$ | 1 | $\frac{1}{2}$ | $\frac{3}{4}$ |
| Dose megarep: | | | | | | | |
| 30 | | | 715 | 255 | 315 | 192 | 70 |
| 60 | | 255 | 406 | 176 | 160 | 100 | 33 |
| 120 | | 206 | 252 | 135 | 75 | 62 | 17 |
| 240 | 250 | | 163 | 106 | 32 | 34 | 11 |
| 480 | 200 | | 87 | 80 | 10 | 20 | 10 |

It will be noted that both allylamine and diallylamine have greatly increased the amount of cross-linking of the polymer of vinyltoluene sulfonic acid when exposed to the same radiation dose as the polymer not containing these two amines. Likewise, the diallylamine is more effective than allylamine by an amount greater than can be accounted for by the fact that it has two allyl groups per molecule compared to one allyl group per molecule for the allylamine.

Example 2

Using the general procedure a polymer of vinyltoluene sulfonic acid having a molecular weight of approximately 400,000 was blended with two concentrations of triallylamine and one concentration of diallylamine to produce films which were irradiated to various radiation doses, after which the degree of swelling in water was determined. The results are shown in Table II.

TABLE II.—PERCENT SWELLING AT VARIOUS RADIATION DOSES AS A FUNCTION OF AMINE AND ITS MOLAR CONCENTRATION

| | Percent Swelling | | |
|---|---|---|---|
| Amine | None | TAA | DAA | TAA |
| Concentration | None | $\frac{5}{16}$ | $\frac{1}{2}$ | $\frac{1}{2}$ |
| Dose megarep: | | | | |
| 5 | | | | 82 |
| 15 | | 52 | | 25 |
| 30 | 703 | 33 | 114 | 15 |
| 60 | 527 | 25 | 93 | 12 |
| 120 | 289 | 17 | 67 | 10 |
| 240 | 183 | 14 | 46 | 8 |
| 480 | 104 | 12 | 27 | 7 |

From these results it can readily be seen that diallylamine and triallylamine again are very effective in reducing the radiation dose required to cross-link the polymer of vinyltoluene sulfonic acid. It is also apparent that the triallylamine is more effective than diallylamine in reducing the radiation dose required by an amount greater than can be accounted for by the fact that triallylamine has three allyl groups per molecule compared to two allyl groups per molecule for the diallylamine. It will be noted from Table II that a dose of 480 megarep is required to produce a 27 percent swelling in the case of one-half molar diallylamine, where as in the case of one-half molar triallylamine a dose of only 15 megarep is required. From this it is concluded that the cross-linking efficiency of triallylamine is $$\frac{480}{15} = 32$$

times greater than that using diallylamine.

Example 3

Using the same general procedure, the sulfonated polymer of Example 2 was mixed with various concentrations of triallylamine and irradiated to various radiation doses and the degree of swelling determined. The results are shown in Table III.

TABLE III.—PERCENT SWELLING AT DIFFERENT IRRADIATION DOSES AS A FUNCTION OF DIFFERENT CONCENTRATIONS OF TRIALLYLAMINE

| | Percent Swelling | | | | |
|---|---|---|---|---|---|
| Concentration | 0 | $\frac{1}{4}$ | $\frac{5}{16}$ | $\frac{3}{8}$ | $\frac{1}{2}$ |
| Dose megarep: | | | | | |
| 5 | | | | | 82 |
| 10 | | | 111 | | 47 |
| 15 | | 105 | 52 | | 25 |
| 20 | | 92 | | 56 | 19 |
| 25 | | 82 | 46 | | 17 |
| 30 | 703 | 73 | 33 | 32 | 15 |
| 60 | 527 | 49 | 25 | 20 | 12 |
| 120 | 289 | 36 | 17 | 14 | 10 |
| 240 | 182 | 27 | 14 | 13 | 8 |
| 480 | 104 | 22 | 12 | 10 | 7 |

Example 4

This example illustrates the effect of using the sulfuric acid salt of an amine in place of the free amine. The sulfuric acid salt of amine was obtained by neutralizing the water solution of the amine with dilute sulfuric acid to a pH of approximately 7 prior to mixing with the sulfonated polymer. Using the general procedure, a polymer of vinyltoluene sulfonic acid (A in table) and a polymer of vinylbenzene sulfonic acid (B in table), each having a molecular weight of approximately 400,000 were mixed with either triallylamine or the triallylamine-sulfuric acid salt in the proportion of $\frac{5}{16}$ mole of the amine or amine salt per mole of the sulfonated polymer. The percent swelling was determined after irradiation of the films to various doses. The results are shown in Table IV.

TABLE IV.—THE EFFECTS OF SULFURIC ACID SALT OF AMINE AS COMPARED TO THE FREE AMINE IN INCREASING THE CROSS-LINKING EFFICIENCY

| Dose megarep | Percent Swelling A | | Percent Swelling B | |
|---|---|---|---|---|
| | Amine | Amine Salt | Amine | Amine Salt |
| 15 | 52 | 27 | | |
| 30 | 33 | 19 | 54 | 31 |
| 60 | 25 | 16 | 41 | 23 |
| 120 | 17 | 14 | 31 | 18 |
| 240 | 14 | 10 | 23 | 14 |
| 480 | 12 | 8 | 19 | 11 |

It is seen from these results that the amine salt decreases the irradiation dose required to give the same degree of swelling by a factor of at least 2 in the high dose range and a factor of at least 4 in the low dose range.

Example 5

Resistivities in ohm-centimeters were determined for all of the compositions in the above examples. When these data were plotted as a function of radiation dose and graphs also plotted of percent swelling as a function of radiation dose, it was possible to compare the resistivity of these various polymers at a specific percent of swelling. In all cases where a given composition produced a polymer which could be irradiated so that it did not swell more than 20 percent, it was found that the minimum resistivity (greatest conductivity) was obtained in the range of from 25 to 65 percent swelling. This is illustrated in Table V which shows the data read from these curves for the polymers of Examples 2 and 3.

TABLE V.—RESISTIVITY AS A FUNCTION OF PERCENT SWELLING

| | Resistivity ohm-cm.) | | | | |
|---|---|---|---|---|---|
| Amine | TAA | TAA | TAA | TAA | DAA |
| Concentration | $\frac{1}{4}$ | $\frac{5}{16}$ | $\frac{3}{8}$ | $\frac{1}{2}$ | $\frac{1}{2}$ |
| Percent Swelling: | | | | | |
| 10 | | | 54 | 69 | |
| 20 | 15 | 13 | 19 | 24 | |
| 30 | 11 | 12 | 15 | 20 | 24 |
| 40 | 9 | 11 | 14 | 19 | 22 |
| 50 | 9 | 13 | 15 | 19 | 21 |
| 60 | 11 | 14 | 17 | 20 | 22 |
| 70 | 12 | 15 | 18 | 21 | 24 |
| 80 | 13 | | 21 | 22 | 26 |

Example 6

Films were made as described in general procedure, using a sulfonated polymer of vinyltoluene sulfonic acid having a molecular weight of approximately 400,000, triallylamine which was in the form of its sulfuric acid salt in the proportion of $\frac{1}{3}$ mole of the amine salt per mole of the sulfonated polymer and also containing one part by weight of a copolymer of vinylpyrrolidone-ethyl acrylate for each three parts of the sulfonated polymer. The vinylpyrolidone-ethyl acrylate copolymer used was an emulsion having 40 percent resin solids. Films of these polymers were irradiated to various radiation doses and the percent swelling and resistivity were measured. The results are given in Table VI.

TABLE VI

| Dose megarep | Percent Swelling | Resistivity (ohm-cm.) |
|---|---|---|
| 15 | | |
| 30 | 17 | 23 |
| 60 | 11 | 30 |
| 120 | 7 | 43 |
| 240 | 5 | 69 |
| 480 | 3 | |

Example 7

Films were prepared similar to those in Example 6 in which the vinylpyrolidone-ethyl acrylate copolymer was replaced by an equal weight of a rubbery copolymer of butadiene and acrylonitrile. After irradiation to various doses, the percent swelling and resistivity were measured to obtain the results shown in Table VII.

TABLE VII

| Dose megarep | Percent Swelling | Resistivity (ohm-cm.) |
|---|---|---|
| 15 | 27 | 15 |
| 30 | 16 | 19 |
| 60 | 10 | 27 |
| 120 | 8 | 42 |

The results of Examples 6 and 7 show that the incorporation of other polymers has still further reduced the amount of swelling but surprisingly has maintained the low resistivities comparable to the same compositions not having the added polymer but higher swelling. All of the compositions of Examples 1–7 readily sorb cations present in aqueous solution due to the presence of the sulfonic acid groups.

The cross-linked compositions prepared by our process can be used for all those applications for which ion exchange resins have found utility. For example, the compositions in film form can be used as solid electrolyte in fuel cells as described in U.S. Patent 2,913,511. They may also be used as the membrane in electrodialysis cells, or in the treating of aqueous solutions to remove cations. The compositions in granular or powdered form may also be used for removal of cations from solution. Other uses and applications of these compositions will be readily apparent to those skilled in the art.

Obviously, other modifications and variations of the present invention are possible in light of the above teachings. For example, the aqueous solutions may be used to impregnate porous solids such as ceramic bodies, foamed plastics, foamed glass, cinders, diatomaceous earth, and other porous inert bodies or they may be used to coat impervious bodies to produce an ion exchange material on the surfaces of these materials and then cross-linked by irradiation to produce useful bodies which also may be used as ion exchange resins for the removal of cations from aqueous solutions, or to produce conductive films to reduce static charges. It is therefore to be understood that changes may be made in the particular embodiments of the invention described which are within the full intended scope of the invention as defined by the appended claims.

What we claim as new and desire to secure by Letters Patent of the United States is:

1. A composition comprising a mixture of (a) a water-soluble sulfonated polymer of a vinylaryl compound selected from the group consisting of vinylbenzene and vinyltoluene, and (b) from 10 to 100 mole percent, based on the polymer of (a) a monomer selected from the group consisting of allylamine, diallylamine, triallylamine and sulfuric acid salts of these three amines.

2. The composition of claim 1 wherein the component of (a) is a sulfonated polymer of vinylbenzene.

3. The composition of claim 1 wherein the component of (a) is a sulfonated polymer of vinyltoluene.

4. The composition of claim 1 wherein the component of (b) is allylamine.

5. The composition of claim 1 wherein the component of (b) is diallylamine.

6. The composition of claim 1 wherein the component of (b) is triallylamine.

7. The composition of claim 1 wherein the component of (b) is a sulfuric acid salt of allylamine.

8. The composition of claim 1 wherein the component of (b) is a sulfuric acid salt of diallylamine.

9. The composition of claim 1 wherein the component of (b) is a sulfuric acid salt of triallylamine.

10. A cross-linked composition comprising a mixture of (a) a sulfonated polymer of a vinylaryl compound selected from the group consisting of vinylbenzene and vinyltoluene, and (b) from 10 to 100 mole percent, based on the polymer of (a) a monomer selected from the group consisting of allylamine, diallylamine, triallylamine and sulfuric acid salts of these three amines, said composition having been cross-linked and rendered water-insoluble by exposure to ionizing radiation.

11. The composition of claim 10 wherein the component of (a) is a sulfonated polymer of vinylbenzene.

12. The composition of claim 10 wherein the component of (a) is a sulfonated polymer of vinyltoluene.

13. The composition of claim 10 wherein the component of (b) is allylamine.

14. The composition of claim 10 wherein the component of (b) is diallylamine.

15. The composition of claim 10 wherein the component of (b) is triallylamine.

16. The composition of claim 10 wherein the component of (b) is a sulfuric acid salt of allylamine.

17. The composition of claim 10 wherein the component of (b) is a sulfuric acid salt of diallylamine.

18. The composition of claim 10 wherein the component of (b) is a sulfuric acid salt of triallylamine.

19. The composition of claim 10 wherein the ionizing radiation is high energy electrons.

No references cited.

MURRAY TILLMAN, *Primary Examiner.*

S. H. BLECH, *Examiner.*

R. B. TURER, *Assistant Examiner.*